United States Patent [19]
Miyazaki et al.

[11] Patent Number: 5,295,653
[45] Date of Patent: Mar. 22, 1994

[54] VIBRATION INSULATOR HAVING BRACKET

[75] Inventors: Takeshi Miyazaki; Tetsuya Takamori; Yutaka Ogasawara; Minoru Yamashita; Takaharu Shibuya, all of Inazawa, Japan

[73] Assignee: Toyoda Gosei Co., Ltd., Nishikasugai, Japan

[21] Appl. No.: 955,440

[22] Filed: Oct. 2, 1992

[30] Foreign Application Priority Data

Oct. 11, 1991 [JP] Japan .................................. 3-292505
Oct. 25, 1991 [JP] Japan .................................. 3-306813

[51] Int. Cl.$^5$ .............................................. F16M 3/00
[52] U.S. Cl. .................................... 248/675; 248/121; 248/201; 267/141.2
[58] Field of Search ............... 248/300, 201, 638, 674, 248/675, 121; 180/312, 299, 300; 267/141, 141.2

[56] References Cited

U.S. PATENT DOCUMENTS

| 4,324,452 | 4/1982 | Noguchi et al. | 248/638 X |
| 4,441,684 | 4/1984 | Credle, Sr. | 248/674 |
| 4,492,357 | 1/1985 | Morrill | 248/300 X |
| 4,667,764 | 5/1987 | Sawada et al. | 180/300 X |
| 4,893,595 | 1/1990 | Mertens | 180/300 X |

FOREIGN PATENT DOCUMENTS 61-248931 11/1986 Japan .
62-17633 5/1987 Japan .
62-110037 5/1987 Japan .

*Primary Examiner*—Ramon O. Ramirez
*Attorney, Agent, or Firm*—Cushman, Darby & Cushman

[57] ABSTRACT vibration insulator is provided which includes a vibration insulator section having an outer cylinder, a rubber member which is vulcanization-bonded to the inner peripheral surface of the outer cylinder and an inner cylinder supported by the rubber member, and a bracket for supporting the vibration insulator section, with the thickness of the bracket material being made as small as possible. The bracket is composed of a pair of sheet-metal bracket members holding the axial ends of the vibration insulator. The bracket members include plate-like base sections axially opposed to each other, cylindrical sections which extend axially outward from the base sections and into which the end portions of the outer cylinder are forced, abutting sections extending radially inward from the end edges of the cylindrical sections and abutting the end surfaces of the outer cylinder and joint sections joining the bracket members to each other. A method of manufacturing the vibration insulator bracket is also provided.

8 Claims, 5 Drawing Sheets

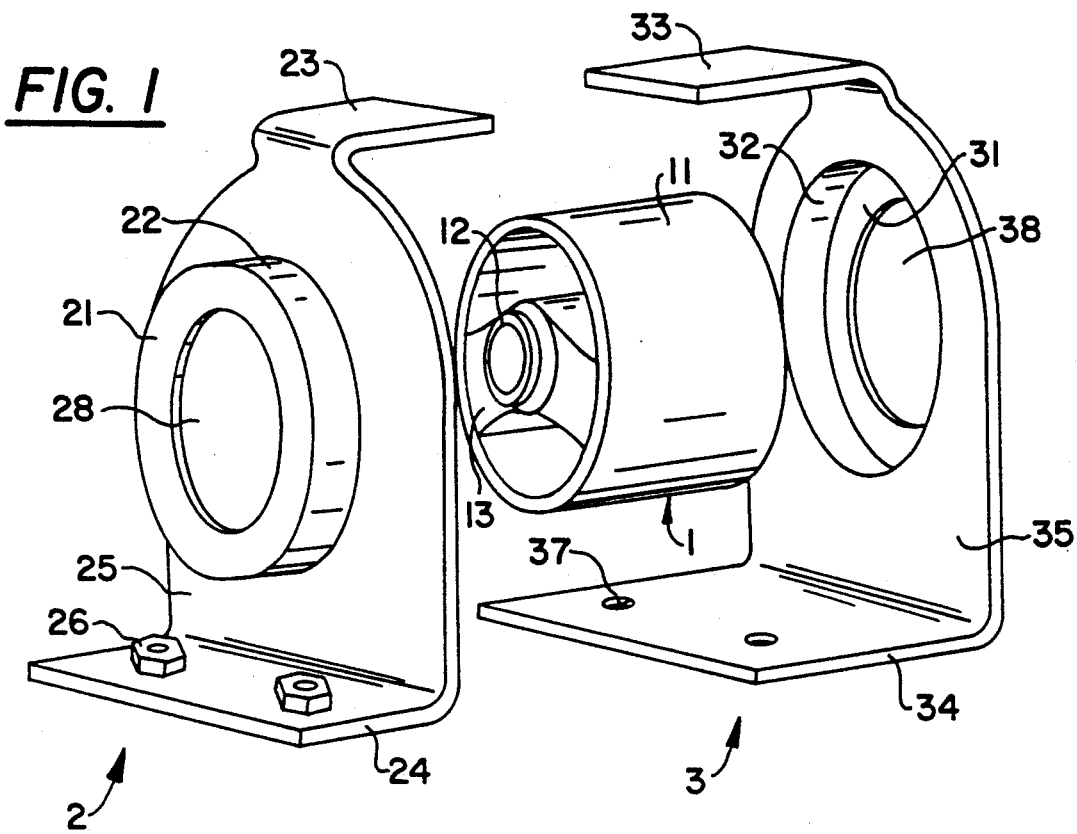
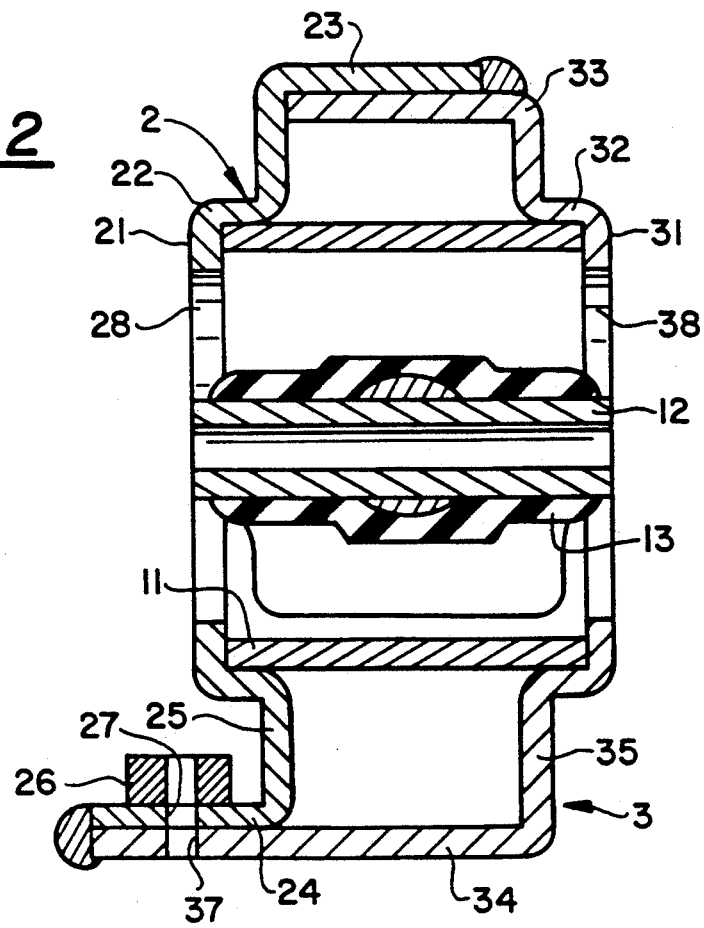

VIBRATION INSULATOR HAVING BRACKET

BACKGROUND OF THE INVENTION

1. Field of the Invention

This invention relates to a vibration insulator and in particular, to a cylindrical rubber vibration insulator having a bracket for securing it in position on a vehicle engine, a vehicle body, etc., with the rubber being vulcanization-bonded to the inner peripheral surface of the vibration insulator.

This invention also relates to an improved method of manufacturing a bracket for securing a vibration insulator bushing in position.

2. Description of the Related Art

Conventionally, a bracket for a rubber vibration insulator of this type has consisted of a cylindrical member, into which the vibration insulating rubber is forced so as to be held therein, and fastening leg sections welded to the cylindrical member.

A problem with the conventional rubber vibration insulator described above is that axial displacement of the rubber is prevented solely by the compressive force of the rubber resulting from it being forced into the cylindrical member. Therefore, the force with which the rubber is forced into the cylindrical member must accordingly be large, which leads to various problems. For example, the wall thickness of the cylindrical member has to be made large. Further, the operation of forcing the rubber into the cylindrical member requires a large-sized apparatus.

FIG. 10 shows an example of a conventional bracket. Referring to the drawing, a bracket 101 comprises a cylindrical holder section 111 and leg sections 112 and 113 respectively welded to either side of the lower peripheral surface of the holder section 111. The bracket 101 is fastened to a base body, such as a vehicle frame, by means of mounting holes 117 provided in the leg sections 112 and 113. A vibration insulator bushing 102 is held in a bore 114 of the cylindrical holder section 111. This vibration insulator bushing 102 consists of concentric inner and outer cylinders 121 and 122 and a rubber vibration insulator 123 disposed between these cylinders and bonded thereto. The outer cylinder 122 is forced into the bore 114, and the inner cylinder 121 is connected to a vibrating body, such as an engine.

A problem with the above-described conventional bracket is that the holder section and leg sections are separately prepared before being welded together, so that it is impossible to avoid the disadvantages of parts storage and positioning during welding, which should be accurate. Consequently, the conventional bracket inevitably involves high production costs. Further, there is the danger of the holder section being distorted during the welding of the leg sections, resulting in deformation of the bore of the holder section, although errors in the bore diameter must be restrained to be as small as possible for the vibration insulating bushing to be smoothly inserted into the bore and reliably held therein.

SUMMARY OF THE INVENTION

This invention has been made in order to solve the above problems in the prior art. It is an object of the present invention to provide a rubber vibration insulator having a bracket formed of a sheet material which is as thin as possible.

To achieve the above object, there is provided, in accordance with this invention, a rubber vibration insulator including a rubber vibration insulator section having an outer cylinder, a rubber member which is vulcanization-bonded to the inner peripheral surface of the outer cylinder and a inner cylinder supported by the rubber member. A bracket is provided for supporting the rubber vibration insulator section. The bracket includes a pair of sheet-metal bracket members for holding the axial ends of the rubber vibration insulator section. The bracket members have plate-like base sections opposed to each other, and cylindrical sections which extend axially outward from the base sections and into which the end portions of the outer cylinder are forced. The bracket members also include abutting sections extending radially inward from the end edges of the cylindrical sections and abutting the end surfaces of the outer cylinder, and joint sections joining the bracket members to each other.

In the rubber vibration insulator of the present invention, the bracket includes a pair of opposed bracket members made of sheet metal. Integrally formed on each bracket member is a cylindrical section into which an end portion of the outer cylinder is forced. An abutting section is provided which abuts an end surface of the outer cylinder. Accordingly, even if the bracket members are made of a thin sheet material, axial displacement of the rubber can be prevented by the abutting sections, and radial displacement thereof is prevented by the cylindrical sections. Due to this arrangement, it is possible to make the thickness of the bracket members as small as possible.

Further, since the bracket members are made of sheet metal, it is possible to form fastening means, such as bolt holes, simultaneously with the formation of the cylindrical sections. Accordingly, accurate positioning of the fastening means can be achieved more easily as compared with the prior art, wherein the fastening leg sections have been welded.

Another object of the present invention is to provide a method of manufacturing a bracket for a vibration insulator bushing which provides satisfactory holding performance, with little trouble and at low cost.

To achieve the above object, there is provided, in accordance with the invention, a method of manufacturing a bracket 101 which is to be associated with a vibration insulator bushing 102 having inner and outer cylinders 121 and 122 and a vibration insulating rubber member 123 arranged therebetween and bonded thereto and which includes a holder section 111 into which the outer cylinder 122 is forced so as to be secured therein and leg sections 112 and 113 protruding from the holder section 111 so as to be fastened to a base body. The method includes the steps of: punching out a single piece of sheet material constituting bracket halves 101A and 101B forming holder section 111 and leg sections 112 and 113, the sheet material being in the form of a substantially linear-symmetrical integral figure; folding the piece of sheet material along the line of symmetry so as to cause the bracket halves 101A and 101B to face each other; and attaching mating portions of the bracket halves to each other to complete the bracket 101.

According to the manufacturing method of the present invention, the holder section 111 and leg sections 112 and 113 of the bracket 101 are integrally formed, so that the disadvantages of parts storage, welding assembly, etc. are not required, resulting in a reduction in production costs. Further, since the leg sections 112 and 113 are not welded to the holder section 111, the holder section is free from welding distortion, and the vibration insulator bushing can be reliably forced into the bore 114 and secured therein.

BRIEF DESCRIPTION OF THE DRAWINGS

FIG. 1 is an exploded perspective view of a rubber vibration insulator having a bracket according to an embodiment the present invention;

FIG. 2 is a sectional view of the central portion of the rubber vibration insulator provided in accordance with the principles of the present invention;

DETAILED DESCRIPTION OF THE PREFERRED EMBODIMENTS

Figure 3:
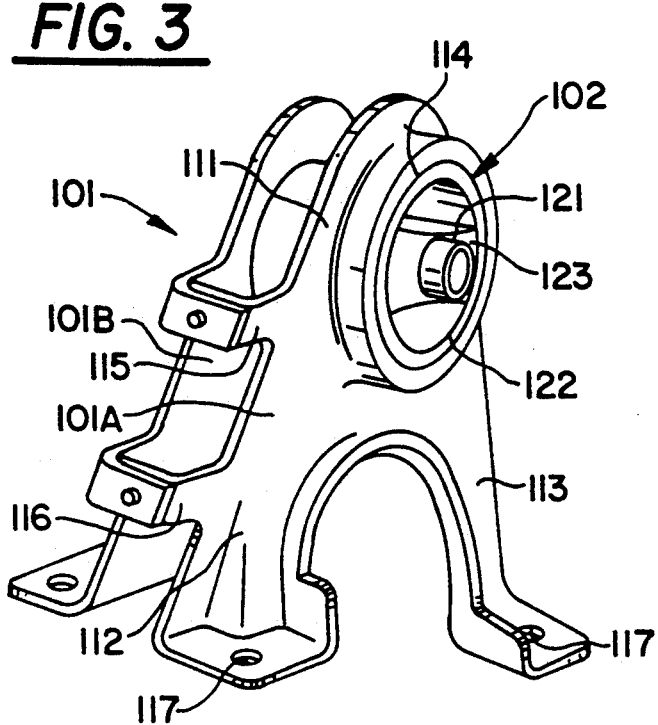
FIG. 3 is a perspective view of a bracket according to an embodiment of the present invention.

An embodiment of the present invention will no be described with reference to FIGS. 1 and 2.

The rubber vibration insulator of this embodiment includes a rubber vibration insulator section 1 and a pair of bracket members 2 and 3.

The rubber vibration insulator section 1 includes a metal outer cylinder 11, a member 13 vulcanization-bonded t the inner peripheral surface of the outer cylinder 11, and a metal inner cylinder 12 supported at the center of the interior of the outer cylinder 11 by the rubber member 13.

The bracket members 2 and 3 are preferably formed of sheet-metal pieces by pressing or the like, and are opposed to each other with the rubber vibration insulator section 1 therebetween. The bracket members 2 and 3 respectively include flat base sections 25 and 35 which are opposed to each other, cylindrical sections 22 and 32 having an L-shaped section, are formed substantially at the center of the base sections 25 and 35 by drawing, and annular abutting sections 21 and 31 which extend radially inward from the ends of the cylindrical sections 22 and 32. The inner peripheral edges of the abutting sections 21 and 31 define holes 28 and 38 through which the end portions of the inner cylinder 12 protrude. The end portions of the outer cylinder 11 are forced into the cylindrical sections 22 and 32 so as to prevent radial displacement of the rubber vibration insulator section 1. The abutting sections 21 and 31 prevent axial displacement of the rubber vibration insulator section 1.

Joint sections 23, 24, 33 and 34 extend from the upper and lower ends of the bracket members 2 and 3. These joint sections are welded together to maintain the state in which the bracket members 2 and 3 hold the rubber vibration insulator section 1 therebetween. The joint section 24 has nuts 26 welded thereto and bolt holes 27. The joint section 34 has bolt holes 37 which are coaxial with the bolt holes 27. The joint sections 24 and 34, having the nuts 26 and the bolt holes 27 and 37, constitute bracket fastening means.

Next, a method of manufacturing the rubber vibration insulator of this embodiment will be described.

First, the pair of bracket members 2 and 3 shown in FIG. 1 are formed of sheet-metal pieces by pressing, drawing, etc.

Then, using the outer and inner cylinders 11 and 12 as inserts, the rubber member 13 is molded and vulcanization-bonded to the outer and inner cylinders 11 and 12. Afterwards, the diameter of the outer cylinder 11 is reduced to a predetermined dimension by drawing, thereby pre-compressing the rubber member 13.

The end portions of the outer cylinder 11, whose diameter has been reduced, are forced into the cylindrical sections 22 and 32 of the bracket members 2 and 3 until the end surfaces of the outer cylinder 11 abut the abutting sections 21 and 31. In this condition, the joint sections 23, 24, 33 and 34 are welded together, thereby completing the bracket for supporting the rubber vibration insulator.

With this rubber vibration insulator produced as described above, axial displacement of the rubber vibration insulator section 1 is prevented by the abutting sections 21 and 31, so that the force with which the rubber vibration insulator section 1 is fitted into the bracket can be reduced as compared to the prior art. Further, the thickness of the bracket members 2 and 3 can be made as small as possible, and the forcing-in of the rubber vibration insulator section 1 can be conducted with a smaller apparatus.

Further, with the rubber vibration insulator of this embodiment, the fastening means, such as the bolt holes 27 and 37 provided in the joint sections 24 and 34, is formed simultaneously with the pressing and drawing of the bracket members, so that the requisite positioning accuracy can be obtained more easily than in the prior art, wherein separate fastening legs have been welded.

While in the above embodiment, the nuts 26 and bolt holes 27 and 37 constituting the fastening means were provided in the joint sections 24 and 34, it is also possible to adopt a structure in which integrally formed leg sections are provided having fastening means which extend from one or both base sections 25 and 35. This arrangement provides the same effect as the above embodiment.

FIG. 3 shows a bracket 101 produced by a method according to the present invention. The bracket 101 includes an upper, substantially triangular holder section 111 and leg sections 112 and 113 extending downward from either end of the bottom of the holder section 111. The holder section 111 and the leg sections 112 and 113 are formed by bracket halves 101A and 101B facing each other and having the same configuration. As described below, the bracket halves 101A and 101B are formed of a continuous single piece of sheet metal, which is bent so as to define one side edge of the bracket. The other side edge of the bracket is formed by upper and lower connecting sections 115 and 116, which overlap each other to be joined together.

This bracket is associated with a vibration insulating bushing 102 which includes inner and outer cylinders 121 and 122 and a rubber vibration insulating member 123. The outer cylinder 122 is forced into a bore 114 formed in the holder section 111 and is secured therein. The bracket 101 is fastened to a vehicle frame or the like by means of mounting holes 117 provided at the lower ends of the front and rear bracket halves 101A and 101B.

A manufacturing process for this bracket will now be described.

Figure 4:
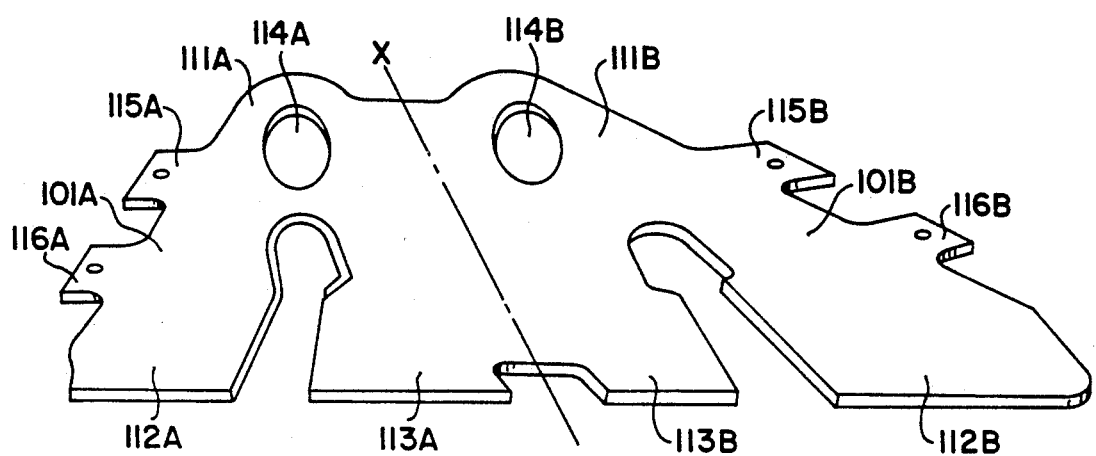
FIG. 4 is a perspective view of a sheet-material piece used for the production of the bracket of FIG. 5 is a perspective view of the sheet material piece shown in FIG. 4 after pressing.

First, a single sheet metal piece is punched out in such a way as to form the bracket halves 101A and 101B, which are symmetrical with respect to a line X, as shown in FIG. 4. Formed in the upper sections of the bracket halves 101A and 101B are holder sections 111A and 111B having openings 114A and 114B, and formed in the lower sections of these bracket halves are forked leg sections 112A, 113A, 112B and 113B, and connecting sections 115A, 116A, 115B and 116B protruding from the side edges of the leg sections.

Figure 6:
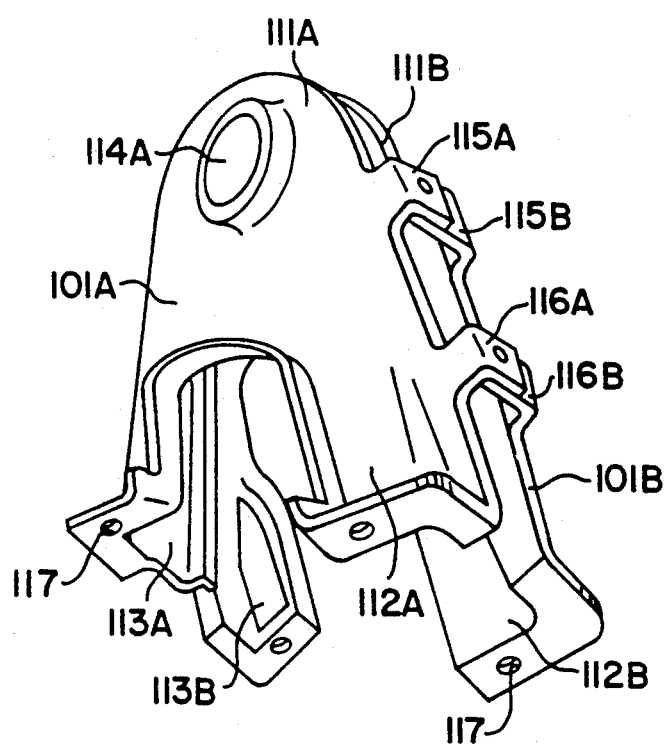
FIG. 6 is a perspective view of the sheet material piece shown in FIG. 5 after folding.
Figure 5:
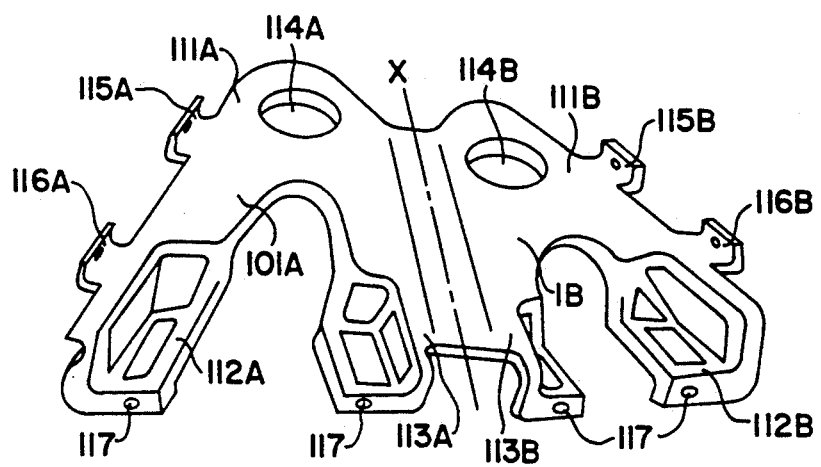

The sheet metal piece thus punched out is further shaped where necessary by pressing (FIG. 5). On this occasion, the connecting sections 115A through 116 and the bottom sections having the mounting holes 117 are bent so as to be vertically raised. Afterwards, the sheet metal piece is bent around the line of symmetry X, with the result that the bracket halves 101A and 101B face each other (FIG. 6). Then, the connecting sections 115A, 115B, 116A and 116B are coupled together preferably by riveting, thereby completing the bracket.

Figure 7:
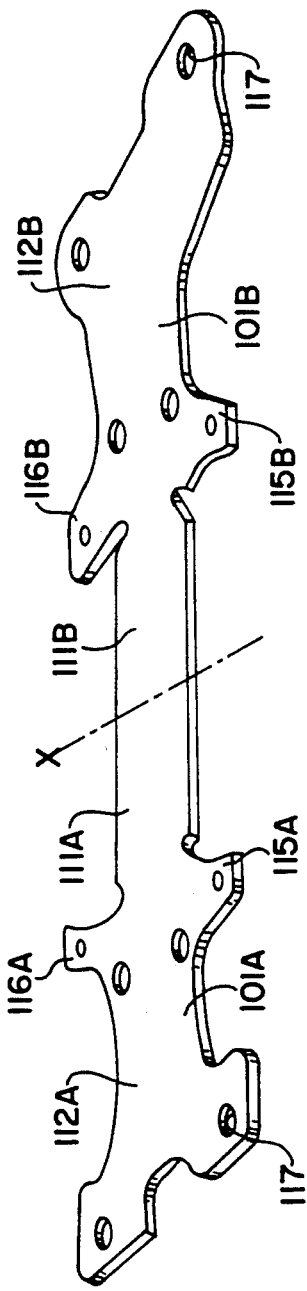
FIG. 7 is a perspective view of a sheet-material piece used for the production of a bracket according to another embodiment of the present invention.
Figure 8:
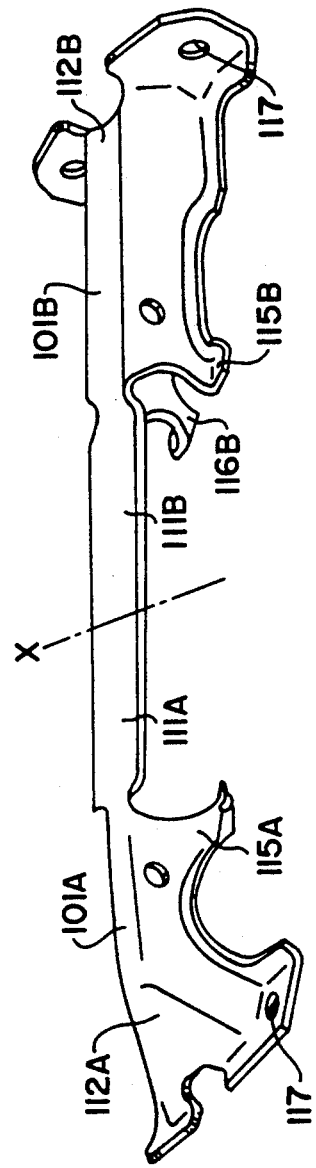
FIG. 8 is a perspective view of the sheet material piece shown in FIG. 7 after pressing.
Figure 9:
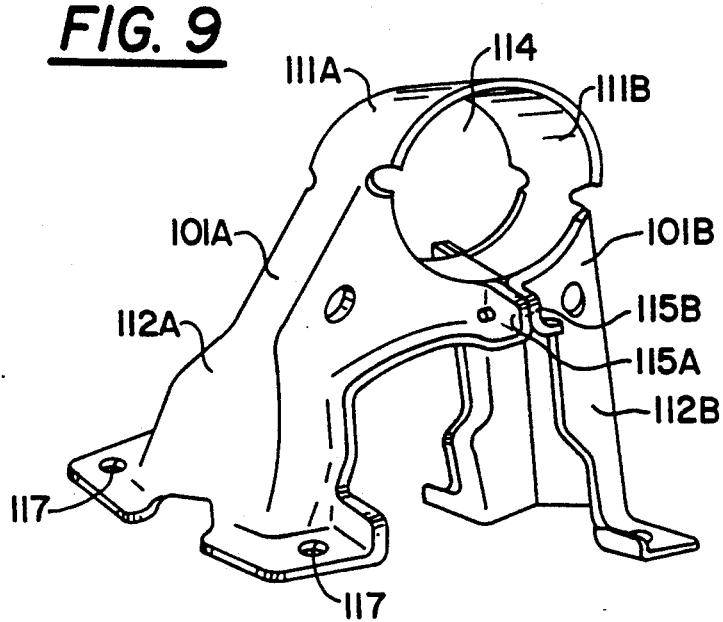
FIG. 9 is a perspective view of the sheet material piece shown in FIG. 8 after folding.
Figure 10:
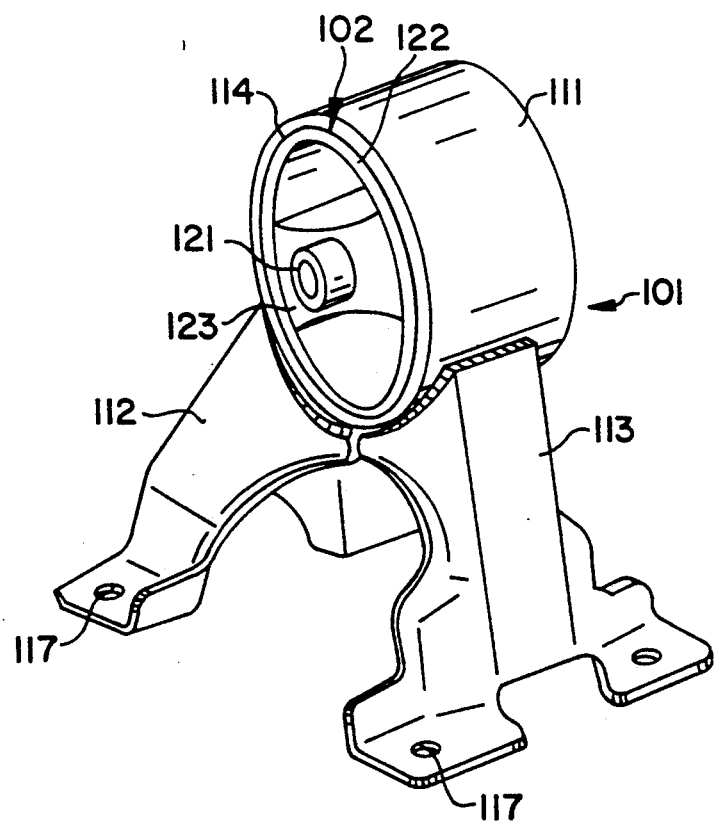
FIG. 10 is a perspective view of a conventional bracket.

It is also possible to punch out a symmetrical piece of sheet metal as shown in FIG. 7. In this case, the line of symmetry is in the middle of an elongated plate. That section of the plate around the line X constitutes the holder sections 111A and 111B, forming the upper half of the circumferential wall defining the bore 114 (FIG. 9). The right and left leg sections 112A and 112B are respectively formed on either end of this section of the plate. This sheet metal piece, thus punched out, is pressed in such a way that the connecting sections 115A, 115B, 116A and 116B and the side edge portions of the leg sections 112A and 112B are bent downward (FIG. 8). Then, the plate is bent in such a way as to define a smooth curve around the line of symmetry X, thereby causing the bracket halves 101A and 101B to face each other (FIG. 9). The connecting sections 115A, 115B, 116A and 116B, which come to abut each other as a result of this process, are preferably riveted together to complete the bracket.

In the above embodiments, the connecting sections may be joined together by joint means other than rivets.

As described above, the manufacturing method of the present invention enables a bracket for a rubber vibration insulator to be produced easily and at low cost. Further, since the method requires no welding operation, the bore for holding the vibration insulating bushing is free from distortion, thereby enabling the bushing to be reliably held.

What is claimed is:

1. A vibration insulator comprising:
   a vibration insulator section including an outer cylinder, a rubber member affixed to an inner peripheral surface of said outer cylinder, and an inner cylinder supported by said rubber member; and
   a bracket for supporting said vibration insulator section, said bracket including:
   bracket members supporting axial end portions of said vibration insulator section,
   plate-like base sections axially opposed to each other, cylindrical sections extending axially outward from said base sections, end portions of said outer cylinder being forced into said cylindrical sections,
   abutting sections extending radially inward from end edges of said cylindrical sections and abutting end surfaces of said outer cylinder, and
   joint sections joining said base sections to each other.

2. A vibration insulator according to claim 1, wherein said bracket members includes a pair of sheet-metal bracket members.

3. A vibration insulator according to claim 1, wherein said cylindrical sections have L-shaped cross-sections.

4. A vibration insulator according to claim 1, wherein said rubber member is vulcanization-bonded to said inner peripheral surface of said outer cylinder 5. A vibration insulator according to claim 1, wherein said bracket members are made of sheet metal.

6. A vibration insulator as claimed in claim 1, wherein said joint sections extend generally perpendicular from upper and lower ends of said base sections.

7. A vibration insulator as claimed in claim 1, wherein said joint sections are riveted together 8. A method of manufacturing a vibration isolator bracket, said vibration isolator having inner and outer cylinders and a rubber member arranged therebetween and bonded thereto, said bracket including a holder section to support axial ends of said vibration insulator, and leg sections protruding from said holder section adapted to be fastened to a base body, said method comprising the steps of:
   punching out a single piece of sheet material defining bracket halves forming said holder section and leg sections, said punched out piece being in the form of a substantially linear-symmetrical integral figure;
   bending the punched out piece of sheet material around the line of symmetry so as to cause said bracket halves to face each other; and
   attaching mating portions of said bracket halves to each other so as to form a bracket.

* * * * *